(12) United States Patent
Fils

(10) Patent No.: US 7,563,989 B1
(45) Date of Patent: Jul. 21, 2009

(54) MOUNTING BRACKET

(76) Inventor: Robert Louis Fils, 23491 Summit Rd., Los Gatos, CA (US) 95033

( * ) Notice: Subject to any disclaimer, the term of this patent is extended or adjusted under 35 U.S.C. 154(b) by 378 days.

(21) Appl. No.: 11/399,858

(22) Filed: Apr. 7, 2006

Related U.S. Application Data

(60) Provisional application No. 60/669,563, filed on Apr. 8, 2005.

(51) Int. Cl.
*H02B 1/40* (2006.01)
(52) U.S. Cl. .................. 174/480; 174/481; 174/50; 174/503; 220/3.2; 220/3.3; 248/906
(58) Field of Classification Search ............... 174/480, 174/481, 50, 53, 57, 58, 503, 61, 63; 220/3.2–3.9, 220/4.02; 248/906, 343, 200, 200.1, 311.2, 248/27.1, 219.4; 33/DIG. 10, 528; 361/600, 361/601, 683, 684, 724, 725
See application file for complete search history.

(56) References Cited

U.S. PATENT DOCUMENTS

| | | | | |
|---|---|---|---|---|
| 4,140,293 | A * | 2/1979 | Hansen | 174/58 |
| 5,295,644 | A * | 3/1994 | Ferguson, Jr. | 248/27.1 |
| 5,619,263 | A * | 4/1997 | Laughlin et al. | 248/906 |
| 5,921,522 | A * | 7/1999 | Weber | 248/906 |
| 6,069,789 | A * | 5/2000 | Jung | 361/684 |
| 6,185,303 | B1 * | 2/2001 | Losey | 248/219.4 |
| 6,376,770 | B1 * | 4/2002 | Hyde | 174/58 |
| 6,857,197 | B2 * | 2/2005 | Hicks | 33/528 |
| 6,958,448 | B2 * | 10/2005 | Nave | 174/58 |
| 7,227,080 | B2 * | 6/2007 | Kregle et al. | 174/50 |

OTHER PUBLICATIONS http://www.polyplanar.com/configuration.asp.
http://www.polyplanar.com/stereos.asp.
http://www.polyplanar.com/accessories.asp.
http://www.brokenlegdave.com/Manufacture/Polyplanar/MA4054RC.htm.
http://www.starmarinedepot.com/Poly-Planar+MRR-7+Wired+remote+(White).html.
http://www.starmarinedepot.com/Poly-Planar+IMR-2+Keypad+Interface+Module.html.
http://www.starmarinedepot.com/Poly-Planar+MRR2+Wireless+Remote.html.

* cited by examiner

*Primary Examiner*—Angel R Estrada
(74) *Attorney, Agent, or Firm*—Haverstock & Owens LLP

(57) ABSTRACT

The present invention is directed to systems for and methods of securing and mounting objects to structures. An exemplary system of the present invention includes a bracket that has a base for coupling to a surface of a structure and an alignment handle detachably coupled to the base for aligning the structure during installation. The alignment handle is configured to be uncoupled from the base after installation. Preferably, a surface of the alignment handle and a surface of the base form an obtuse angle. The alignment handle has a breaking point defined by a taper, a notch, or a perforation. The system also includes a housing that includes a cavity for containing an object, such as an electronic device and a face for mounting to the surface. Preferably, the structure is a sauna or a recreational vehicle, such as a plane, a boat, or a car. The structure also includes an electronic device contained in the cavity. The electronic device can be a digital audio player, a digital video player, a radio, or a television set.

26 Claims, 4 Drawing Sheets

MOUNTING BRACKET

RELATED APPLICATION

This application claims priority under 35 U.S.C. § 119(e) of the U.S. provisional patent application Ser. No. 60/669,563, filed Apr. 8, 2005, and titled "Remote Receivers for Two-Way Communication Adapted for Re-charging, Multi-Function Electronic Units, and Detachable Alignment Handles," which is hereby incorporated by reference.

FIELD OF THE INVENTIONS

The present invention relates to housings. More specifically, the present invention relates to systems for and methods of mounting electronic communication devices or other objects.

BACKGROUND OF THE INVENTION

It is often difficult to mount housings on car dashboards, boat consoles, walls, and other places, when the housing is designed both to be flush with the dashboard or other surface and to hold a relatively small but heavy object. The object can be an electronic device, such as an in-dash compact disc player or other entertainment system, or when the housing is a merely a recessed shelf, the object can be compact discs, papers, or other stored objects. Because the object is relatively heavy, the housing must be securely supported on both sides of the surface to which it is attached. And because the housing has a small opening for containing the object, the cavity in the dashboard or other surface provides little room for a user to reach into the cavity during installation to align and secure mounting components. These components can include brackets and housing faces, both with corresponding alignment holes, and screws.

All of these limitations are found on vehicles, such as boats, airplanes, and cars, where electronic devices are often used and where it is difficult to reach to the back surface of a dashboard or other surface to align and install the mounting components. This often leads to time-consuming and frustrating attempts to mount housings, shelves, and the like, especially on vehicles and similar structures.

SUMMARY OF THE INVENTION

The present invention is directed to systems for and methods of securing and mounting objects in structures such as saunas, trailers, and vehicles, including recreational vehicles such as boats, planes, and automobiles, where space is limited. In accordance with the present invention, a bracket has an alignment handle with a detachable component. The alignment handle is configured to allow a user to easily mount an object, such as a housing for an electronic device to a surface of a structure and then, when the alignment handle is no longer needed, to easily detach the alignment handle from the bracket. Once used, this sacrificial alignment handle is removed so that it does not interfere with later installation and mounting steps. Using the alignment handle, a user is able to position the bracket along a back of the surface without having to reach through to the back the surface when installing the bracket. The installation process is thus simplified, requiring few if any specialized tools.

In a first aspect of the present invention, a structure includes a bracket, which includes a base for coupling to a surface of a structure and an alignment handle detachably coupled to the base. Preferably, a surface of the alignment handle and a surface of the base form an obtuse angle. The alignment handle is for aligning the structure during installation and is configured to be uncoupled from the base after installation. In one embodiment, the alignment handle has a breaking point, which is defined by a taper (e.g., a narrowing of a width), a notch, or a perforation, which allows the alignment handle to be removed from the base by twisting or snapping it.

The structure also includes a housing, which has a cavity for containing an electronic device and a face for mounting to the surface. The base includes one or more first mounting holes. The face has second mounting holes for aligning with the first mounting holes. The first and second mounting holes are for receiving fasteners to secure the housing to the surface. Fasteners include screws, pins, nails, snapping elements, and high-strength adhesives such as epoxies, to name a few.

Preferably, the structure is any type of vehicle, recreational or otherwise, such as a car, a truck, a plane, a mobile home, or a boat, to name a few vehicles. Alternatively, the structure is a sauna, a trailer, a garage, or even a room in a house.

The structure also includes an electronic device contained in the cavity. The electronic device is any one of a digital audio player, a digital video player, a radio, and a television set.

In a second aspect of the invention, a method of securing an electronic device to a surface of a structure includes inserting a housing through an aperture in the surface, where the housing has a cavity; guiding a bracket into the cavity, where the bracket has a detachable alignment handle; securing the bracket to the housing and to the surface, thereby securing the cavity to the surface; and detaching the alignment handle from the bracket. The housing has a first set of mounting holes, the bracket has a second set of mounting holes, and the surface has a third set of mounting holes. The method also includes aligning the first, second, and third sets of mounting holes and inserting fasteners through them. The method also includes inserting an electronic device into the cavity. The electronic device can be coupled to speakers, microphones, digital displays, manual controls, or other peripheral devices.

In a third aspect of the present invention, a system includes a housing and a bracket module. The housing has a cavity and a face with housing mounting holes. The bracket module has a detachable alignment handle portion and a base portion that includes bracket mounting holes for aligning with the housing mounting holes. In one embodiment, the face includes a first winged portion and a second winged portion. The first winged portion has a first set of mounting holes from the housing mounting holes, and the second winged portion has a second set of mounting holes from the housing mounting holes.

In one embodiment, the bracket module includes a first bracket and a second bracket. The first bracket has a first detachable alignment handle and a first base with a third set of mounting holes for aligning with the first set of mounting holes. The second bracket has a second detachable alignment handle and a second base with a fourth set of mounting holes for aligning with the second set of mounting holes.

Preferably, a surface of the detachable alignment handle portion forms an obtuse angle with a surface of the base portion. The cavity contains an electronic device and the first base and first face are fastened to a surface of a structure and the second base and second face are also fastened to the surface of the structure, thereby securing the housing to the structure.

DETAILED DESCRIPTION OF THE PREFERRED EMBODIMENT

In accordance with the present invention, a housing for an electronic device is able to be easily mounted to a wall of a recreational vehicle or other structure. Mounting in accordance with the present invention is especially useful in areas where space is limited. For example, mounting electronic devices is especially difficult in cars, trucks, and recreational vehicles, such as boats, planes, mobile homes, trailers, and the like. Space can also be limited, and thus mounting made difficult, in rooms in houses, garages, and many other places.

Figure 1:
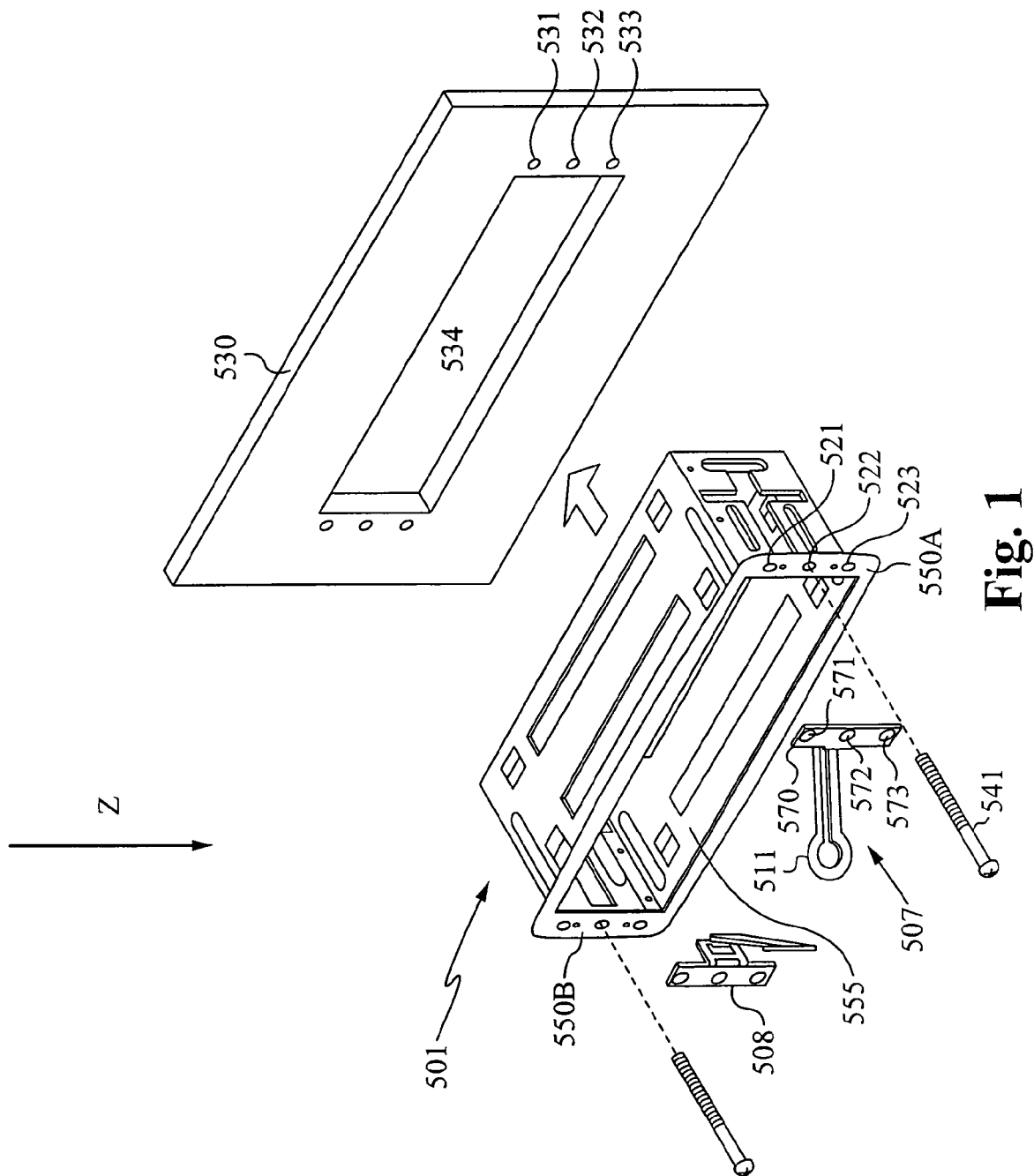
FIG. 1 shows an exploded view of a housing and a bracket with a detachable alignment handle in accordance with the present invention.

FIG. 1 shows brackets 507 and 508 in accordance with the present invention, for mounting an electronic device, such as a DVD player, a CD player, a television set, a radio, or a digital music player, to name a few devices. Because the bracket 508 is identical to the bracket 507, its structure, alignment, and use will not be discussed here.

As described below, the bracket 507 has a detachable alignment handle 511 and a base 570 with mounting holes 571-573. The alignment handle 511 extends from the base 570, preferably at an angle greater than 90 degrees; alternatively, the alignment handle 511 extends from the base 570 at a different angle. Preferably, the bracket 507 is made of a metal, but it can also be made from a hard plastic or any other material suitable for mounting a housing, as described below.

Still referring to FIG. 1, when mounting an electronic device (not shown) into a wall 530 or other surface (e.g., a partition, dashboard, floor, or ceiling) of a structure, such as on a boat, house, airplane, automobile, truck, recreational vehicle, motor home, or trailer, a user first inserts a housing 501 of the electronic device into a cut-out 534 (e.g., aperture) of the wall 530, so that the holes 531-533 in the wall 530 are aligned with the holes 521-523, respectively, of the housing 501. As shown in FIG. 1, the holes 521-523 are located on an extended or winged face 550A of the housing 501. A similar winged face 550B is located at an opposite end of the housing 501.

Figure 2:
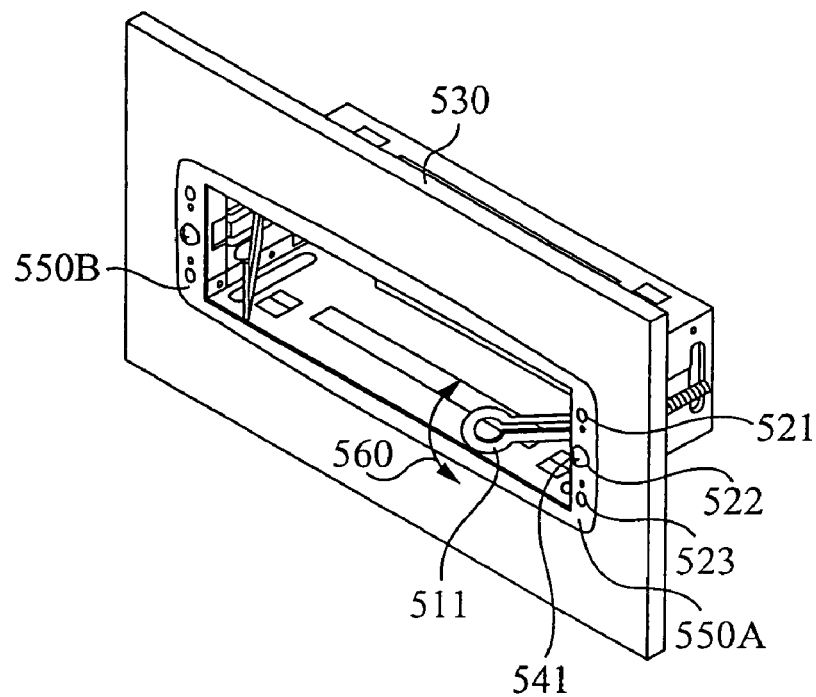
FIG. 2 shows the housing and the bracket of FIG. 1 inserted into a cut-out in a wall.
Figure 3:
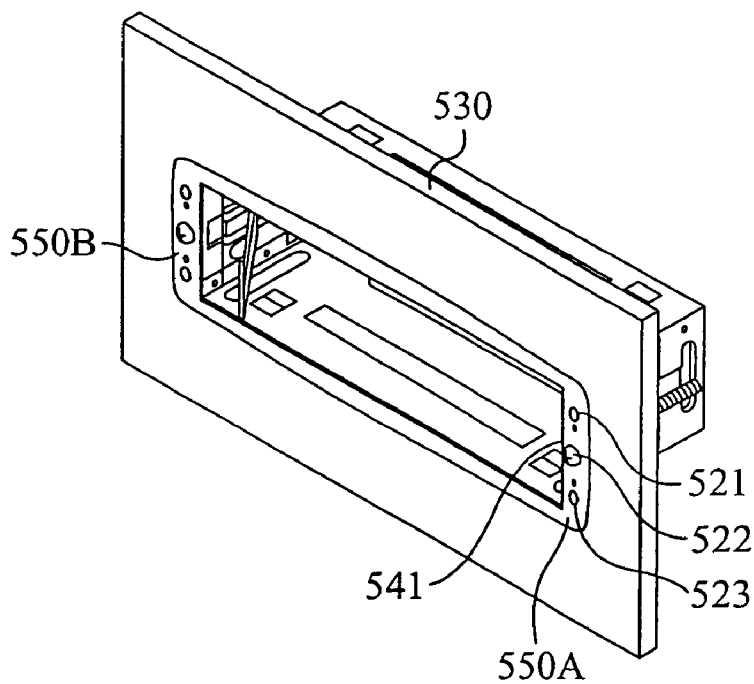
FIG. 3 shows the housing and the bracket of FIG. 1 inserted into a cut-out in a wall, with the detachable alignment handle detached.

Next, using the detachable alignment handle 511, a user is able to maneuver the base 570 through a cavity 555 of the housing 501, behind a back face of the wall 530, and then aligned with the wall so that holes 571-573 in the base 570 are aligned with the holes 531-533, respectively. The bracket 507 and the face 550A, on opposite surfaces of the wall 530, are then secured to the wall 530 by use of mounting screws, such as the mounting screw 541 inserted through the aligned holes 522 and 532, such as shown in FIG. 2. Securing the face 550B to the wall 530 in a similar manner secures the housing 501 to the wall 530. Finally, the detachable alignment handle 511 (and also alignment handle 508) is twisted, rotated, bent, moved back-and-forth, moved side-to-side, or otherwise moved, as shown by the arrow 560, and removed, as shown in FIG. 3. After the housing 501 has been securely mounted to the wall 530, the electronic device is fitted into the housing 501 and can be attached to other peripheral devices, such as remote receivers, speakers, speaker-intercom units, multi-function units, and the like.

Figure 4:
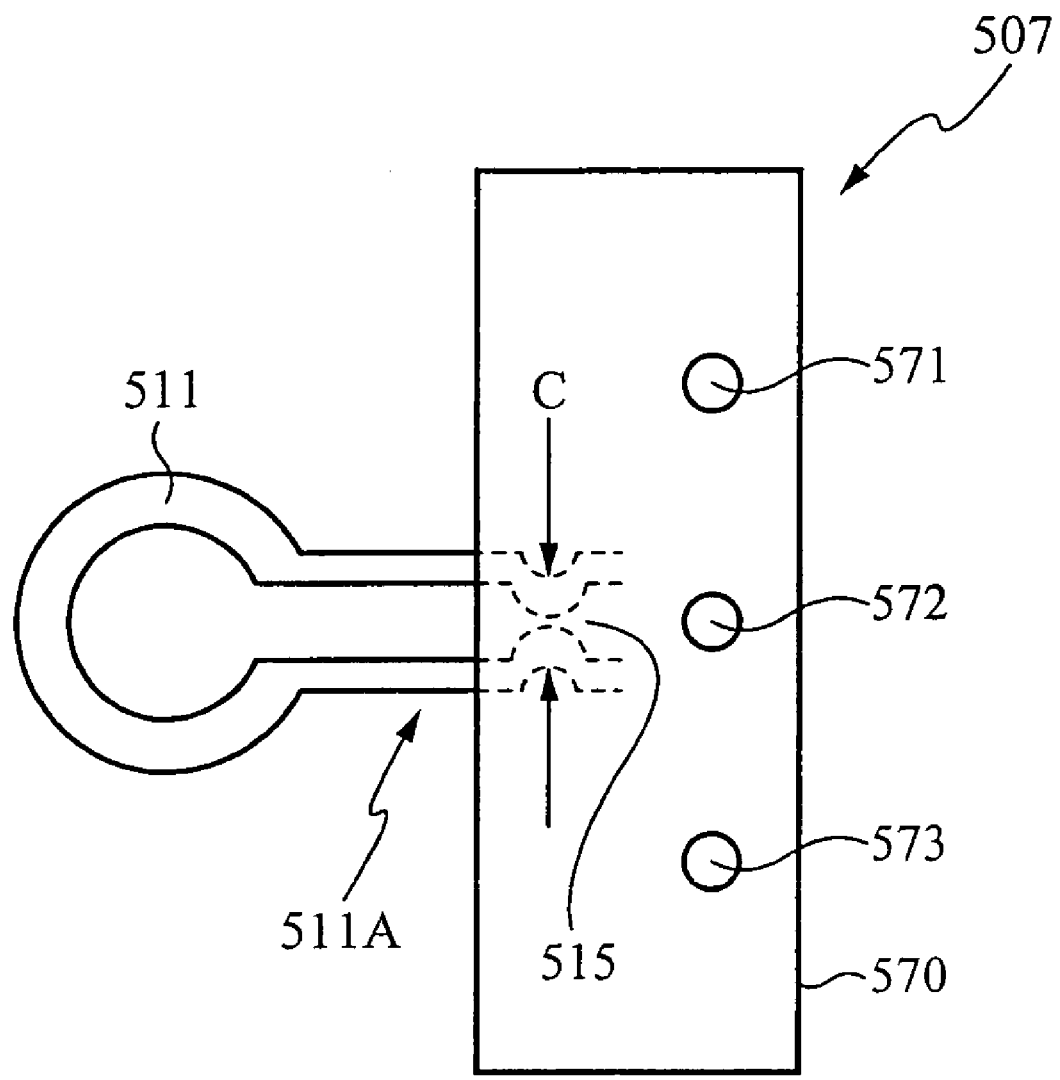
FIG. 4 is a larger view of the detachable alignment handle of FIG. 1, showing a portion of the handle in phantom view.

It will be appreciated that the detachable alignment handle 511 can have many configurations that allow it to be used for guiding the bracket 507 during installation and then removed. FIG. 4 shows one such configuration of the bracket 507. As shown in FIG. 4, the detachable handle 511 has a neck 511A that narrows to (e.g., tapers to) a width C at a point 515 close to where the handle 511 couples to the base 570 (referred to as a "breaking point"). By twisting the detachable alignment handle 511 about the point 515, creating fatigue, the detachable handle 511 can be easily detached from the base 570 at or near the breaking point. Thus, after being used to align the bracket 507 and secure the housing 501, the detachable handle 511 is removed so that it does not obstruct the insertion of the electronic device into the cavity 555 of the housing 501. To this end, those skilled in the art will recognize suitable lengths for the distance from the point 515 to the base 570.

Those skilled in the art will recognize many values for the width C, large enough to provide strength sufficient to allow the base 570 to be positioned during the installation of the housing 501 yet small enough to allow the detachable alignment handle 511 to be easily detached from the base 570. Those skilled in the art will also recognize other structures for handles, such as those with perforated or notched sections near the breaking point, that allow them to be easily detached after securing a housing.

Figure 5:
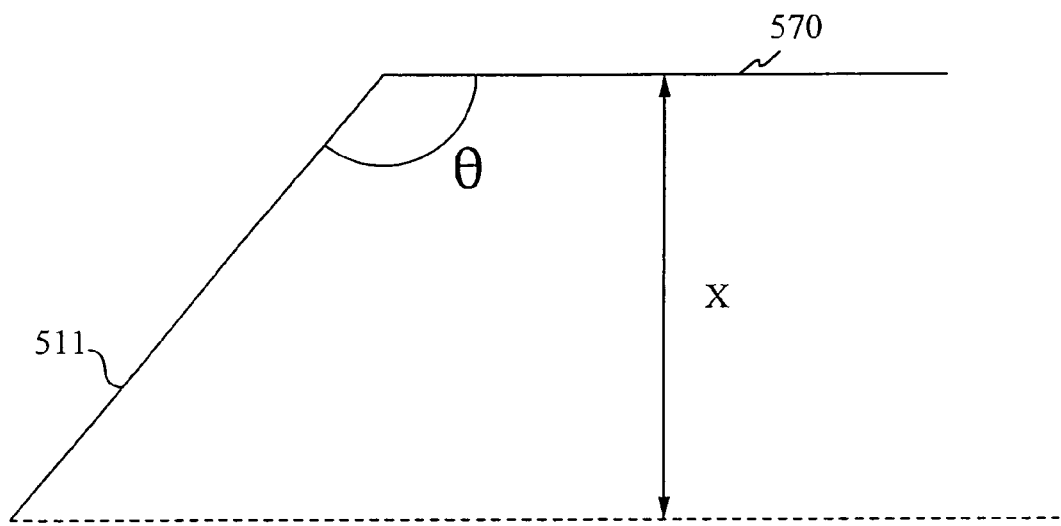
FIG. 5 is a top cross-sectional view of the detachable alignment handle of FIG. 1.

FIG. 5 is a top cross-sectional view of the bracket 507 of FIG. 1, taken from the direction of the arrow labeled Z shown in FIG. 1. As shown in FIG. 5, a surface of the base 570 makes an angle θ with a surface of the detachable alignment handle 511. Preferably, the angle θ is obtuse, that is, greater than ninety degrees. Also, as shown in FIG. 5, the detachable alignment handle 511 extends a length (linear distance) X from the base 570. Those skilled in the art can easily determine values for X that allow a user to easily insert the bracket into a cut-out of a wall or other aperture in a surface. A value for X can be selected, for example, so that a user does not have to insert his hand into the cut-out when inserting and aligning the bracket 507 during installation.

It will be appreciated that while the examples above describe housings for electronic devices, these examples are not meant to limit uses of the invention. Brackets in accordance with the present invention are able to mount objects, such as housings, shelves, and other structures that use brackets, even those that support light objects such as tissue boxes. As one example, brackets in accordance with the present invention are able to be used to mount recessed shelves, such as shelves with an opening flush with a surface and that extend a depth into the surface. Such recessed shelves are useful because they take up less space than shelves that extend from a surface. Other uses can be found for brackets and other features of the present invention.

It will be readily apparent to one skilled in the art that various modification may be made to the embodiments without departing from the spirit and scope of the invention as defined by the appended claims.

What is claimed is:

1. A structure comprising a bracket, the bracket comprising:

a. a base for coupling to a surface of a structure; and b. an alignment handle detachably coupled to the base for aligning the structure during installation, wherein the alignment handle is configured to be uncoupled from the base after installation, and further wherein the alignment handle has a breaking point.

2. The structure of claim 1, wherein a surface of the alignment handle and a surface of the base form an obtuse angle.

3. The structure of claim 1, wherein the breaking point is defined by a taper.

4. The structure of claim 1, wherein the breaking point is defined by one of a notch and a perforation.

5. The structure of claim 1, further comprising a housing comprising:

a. a cavity for containing an electronic device; and b. a face for mounting to the surface.

6. The structure of claim 5, wherein the base comprises one or more first mounting holes.

7. The structure of claim 6, wherein the face has second mounting holes for aligning with the first mounting holes, the first and second mounting holes for receiving fasteners to secure the housing to the surface.

8. The structure of claim 1, wherein the structure is any one of a plane, a boat, and a car.

9. The structure of claim 1, wherein the structure is any one of a sauna, a trailer, a mobile home, and a house.

10. The structure of claim 5, further comprising an electronic device contained in the cavity.

11. The structure of claim 10, wherein the electronic device is any one of a digital audio player, a digital video player, a radio, and a television set.

12. A method of securing an electronic device to a surface of a structure comprising:

a. inserting a housing through an aperture in the surface, the housing defining a cavity;

b. guiding a bracket into the cavity, the bracket having a detachable alignment handle;

c. securing the bracket to the housing and to the surface, thereby securing the cavity to the surface; and d. detaching the alignment handle from the bracket.

13. The method of claim 12, wherein the housing has a first set of mounting holes, the bracket has a second set of mounting holes, the surface has a third set of mounting holes, the method further comprising aligning the first, second, and third sets of mounting holes and inserting fasteners through the first, second, and third sets of mounting holes.

14. The method of claim 12, wherein the detachable alignment handle has a breaking point defined by a taper.

15. The method of claim 12, wherein the detachable alignment handle has a breaking point defined by one of a notch and a perforation.

16. The method of claim 12, further comprising inserting an electronic device into the cavity.

17. The method of claim 16, wherein the electronic device is any one of a digital audio player, a digital video player, a radio, and a television set.

18. The method of claim 12, wherein the structure is any one of a boat, a plane, and a car.

19. The method of claim 12, wherein the structure is any one of a sauna, a trailer, a mobile home, and a house.

20. A system comprising:

a. a housing defining a cavity and having a face with housing mounting holes; and b. a bracket module with a detachable alignment handle portion having a break point and a base portion that includes bracket mounting holes for aligning with the housing mounting holes.

21. The system of claim 20, wherein the face comprises a first winged portion with a first set of mounting holes from the housing mounting holes and a second winged portion with a second set of mounting holes from the housing mounting holes.

22. The system of claim 21, wherein the bracket module comprises a first bracket and a second bracket, wherein the first bracket has a first detachable alignment handle and a first base with a third set of mounting holes for aligning with the first set of mounting holes and the second bracket has a second detachable alignment handle and a second base with a fourth set of mounting holes for aligning with the second set of mounting holes.

23. The system of claim 20, wherein a surface of the detachable alignment handle portion forms an obtuse angle with a surface of the base portion.

24. The system of claim 23, wherein the break point of the detachable alignment handle portion is defined by one of a taper, a notch and a perforation.

25. The system of claim 24, wherein the cavity contains an electronic device and the first base and first face are fastened to a surface of a structure and the second base and second face are fastened to the surface of the structure, thereby securing the housing to the structure.

26. The system of claim 25, wherein the structure is any one of a boat, a car, an automobile, a plane, a mobile home, a truck, a trailer, and a sauna.

\* \* \* \* \*